April 9, 1935.  H. A. OLSON  1,997,339
FISH SCALER
Filed Nov. 9, 1931
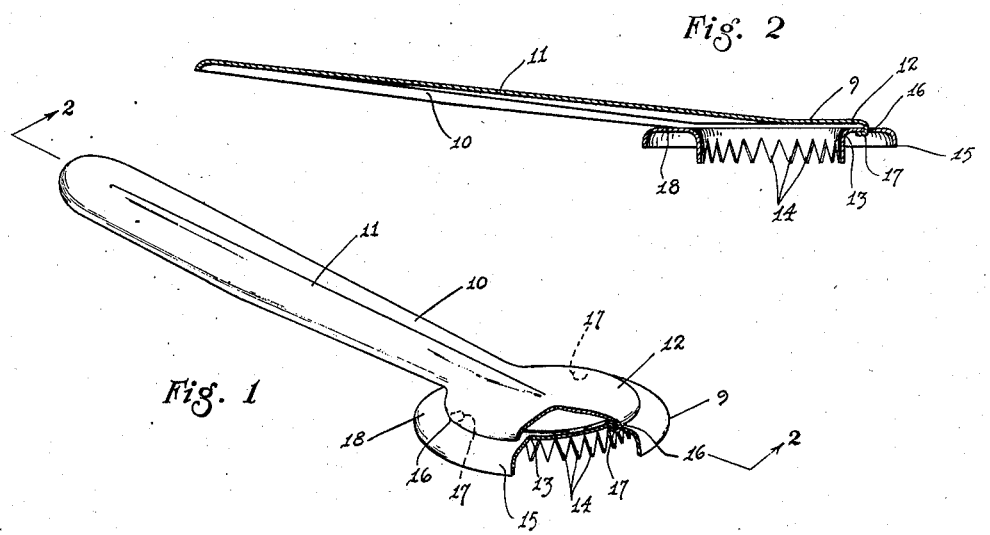
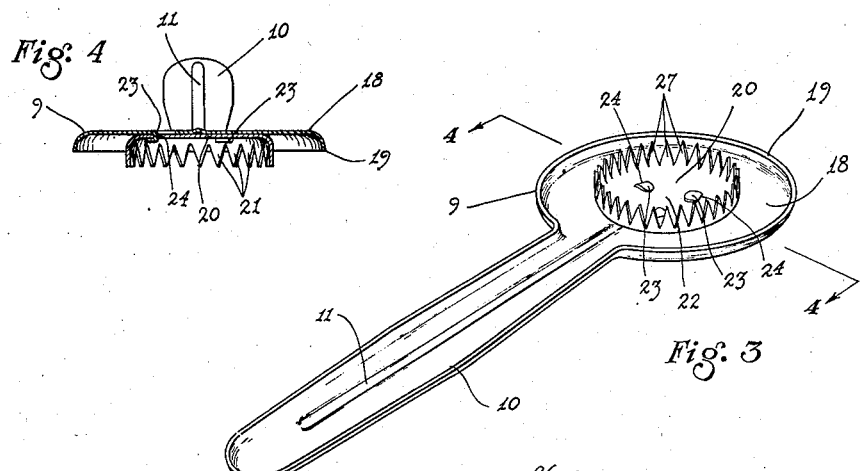
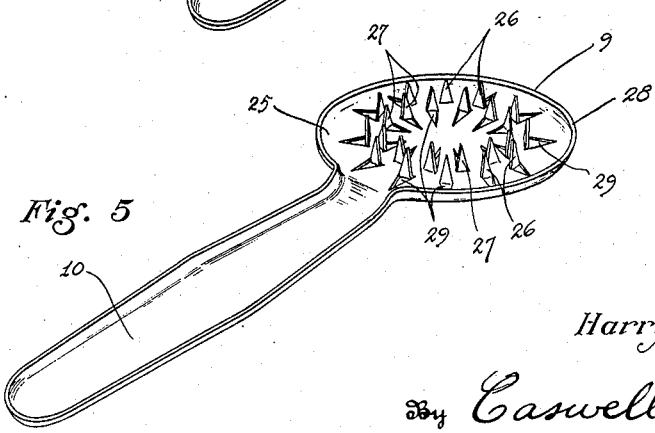
Inventor
Harry A. Olson
By Caswell & Jagaard
Attorneys Patented Apr. 9, 1935

1,997,339

UNITED STATES PATENT OFFICE 1,997,339

FISH SCALER

Harry A. Olson, Minneapolis, Minn.

Application November 9, 1931, Serial No. 573,779

4 Claims. (Cl. 17—7)

My invention relates to fish scalers and has for an object to provide a fish scaler by means of which the scales of fish may be more conveniently removed and by means of which the scales are prevented from being scattered about in the use of the device.

An object of the invention resides in providing a body member with a handle attached thereto and in providing prongs or serrations issuing outwardly from said body member and in constructing said body member so as to cover said prongs or serrations at the bases thereof to prevent the flying about of the scales of the fish when the fish scaler is in use.

Another object of the invention resides in arranging the serrations in a row and in causing said body member to extend beyond said serrations on both sides thereof.

A still further object of the invention resides in arranging the serrations in a circle, and in constructing the body circular in form with a portion projecting outwardly beyond the serrations proper.

Another object of the invention resides in forming the serrations and handle of different materials so as to provide a device of sufficient strength and durability.

An object of the invention resides in forming said body member at the edge thereof with a lip or flange adapted to lie in close proximity to the surface of the fish and extending therefrom in the same direction as said serrations.

A still further object of the invention resides in constructing the fish scaler so that the same may be readily formed of sheet metal stampings.

Other objects of the invention reside in the novel combination and arrangement of parts and in the details of construction hereinafter illustrated and/or described.

In the drawing:

Fig. 1 is a perspective view of a scaler illustrating an embodiment of my invention.

Fig. 2 is a sectional view taken on line 2—2 of Fig. 1.

Fig. 3 is a perspective view of another form of the invention.

Fig. 4 is a sectional view taken on line 4—4 of Fig. 3.

Fig. 5 is a perspective view of still another form of the invention.

In the use of open types of fish scalers, considerable annoyance and inconvenience results, due to the scattering about of the scales as the same are removed from the fish. The present invention provides a fish scaler whereby the scales upon being removed are confined so that the same may be deposited wherever desired and so as to prevent the annoyance above referred to.

The form of the invention shown in Fig. 1 comprises a handle 10, which is preferably formed of sheet material and which is constructed longitudinally of the length thereof with a reinforcing rib 11 by means of which said handle is stiffened. At the end of the handle 10 is provided a body member which I have indicated in its entirety at 9 and from which the serrations issue. This body member forms a cap or cover which covers the prongs and prevents the scale from flying about when the fish scaler is in use. This body member or cap may be formed in two parts or the same may be constructed in one piece. In the form of the invention shown in Fig. 1 the body member 9 includes a head 12 in the nature of a circular plate which is integrally constructed with respect to said handle and which is slightly bent out of alignment therewith.

The head 12 of the fish scaler proper has attached to it a member 13 which is circular in form and which is stamped to provide a number of serrations 14 arranged in circular formation about the center of said member. These serrations are formed from the inner portion of the material of said member, leaving the outer marginal portion 18 of the member intact. The member 13 is annular in form and is of somewhat larger diameter than the head 12. This member is constructed at its periphery with a lip or flange 15 which extends from said member in the same direction as the serrations 14 and which forms a guard for preventing the scales removed by the serrations 14 from being scattered about while the scaler is in use.

For the purpose of attaching the member 13 to the head 12, the said member has punched in it a number of circumferentially disposed slots 16, which are adapted to receive tongues 17 formed along the periphery of the head 12. These tongues extend through the slots 16 and are clinched upon the inner surface of the member 13 to hold said member rigidly atttached to the head 12 and handle 11.

In the use of the scaler this handle 11 is grasped in the customary manner and the serrations 14 on member 12 run over the surface of the fish. These serrations remove the scales from the fish, which bound outwardly from the fish and strike the inner surface of the head 12 and the marginal portion 18 of member 13. Due to the flange or lip 15, the scales are caused to be retained within the concavity in the scaler and are prevented from flying about. When the scaler becomes filled with scales, the same may be dipped in water and the accumulated scales removed, after which the scaling may be again continued.

If desired, the body 9 of the fish scaler may be constructed so that the head of the scaler forms the guard for the serrations or prongs. Such construction is illustrated in detail in Figs. 3 and 4. In this form of the invention, the handle 11 is constructed in identically the same manner, except that a head 18 of considerably larger dimensions than the head 12 is formed thereon. This head is constructed of substantially the same diameter as the member 13 and is also formed with a lip or flange 19 at the marginal portion of the same.

In the center of the head 18 is mounted a cup-shaped member 20 which is formed along its edge with serrations 21 extending outwardly therefrom and in the same direction as the lip 19. The member 20 is provided with a planiform portion 22 adapted to lie against the inner surface of the head 18 and through which the same may be attached thereto.

For securing the member 20 to head 18, said head is constructed with a number of tongues 23 similar to the tongues 17, which tongues are received in openings 24 in the planiform portion 22 of member 20 and adapted to be clinched over this portion of the member to hold the same rigidly attached to the head 18. The use of the invention shown in Fig. 3 is identically the same as that illustrated in Fig. 1.

In Fig. 5 I have shown still another form of the invention which may be constructed from a single piece of material. In this form, the body 9 consists solely of a head 25, similar to the head 18 of the device shown in Fig. 3, which head is integrally connected to the handle 11 of the device. This head has struck out from it two rows of prongs 26 and 27, the prongs 27 being struck out from the inner portion of the head 25 and the prongs 26 being struck out from the outer or annular portion of said head. When these prongs are bent outwardly and slightly toward one another, the same lie in substantially circular formation about the head 25 in much the same manner as the prongs 14 and 21 of the other form of the invention. The head 25 is constructed with a lip or flange 28 similar to the flange 15 of the fish scaler shown in Fig. 1 and serves identically the same purpose. In the construction of the prongs 26 and 27, the same are formed relatively narrow so that the openings 29 left by said prongs are sufficiently small to prevent the scales from passing through the head 25. This device is also used in the same manner as the two other forms of the invention.

In the forms of the invention shown in Figs. 1 and 3, the members carrying the prongs or serrations may be constructed of a harder material than that forming the handle and the remainder of the device. These parts may, if desired, be constructed of steel of a sufficient hardness, while the handle and the remainder of the scaler may be formed of a softer and stronger material, more easily formed into the desired shape. A device so constructed will remain sharp for a considerably greater time than when constructed of softer materials and the handle thereof may be formed sufficiently strong to withstand the use to which it is put. By so constructing the parts, a relatively inexpensive scaler is provided which will have an appreciable life.

If desired, the parts of my invention may be secured together by welding instead of through the clinched tongues or in any other desired manner.

The advantages of my invention are manifest. The device functions in a manner to eliminate the usual disadvantages arising in the use of the ordinary fish scaler and prevents the scales from flying about when the scaler is in use. The scaler can be constructed at an extremely economical cost from sheet material, stamped in the desired form and when so constructed is extremely strong, rigid and durable. By making the two parts of different materials, an extremely serviceable device results in which the prongs or serrations used in removing the scales will remain in proper condition indefinitely. The scaler is neat and attractive in appearance and is compact and occupies a minimum amount of space when placed in the tackle box.

Changes in the specific form of my invention as herein disclosed may be made within the scope of what is claimed, without departing from the spirit of my invention.

Having described my invention, what I claim as new and desire to protect by Letters Patent is:

1. A fish scaler comprising a handle, a head formed on said handle, an annular member having prongs struck out from the center thereof and bent into a plane at right angles to the plane of said member to leave an opening in the center of the same and to provide an annular guard extending about said prongs, said head being attachable to said member to close the opening in the center thereof.

2. A fish scaler comprising a dish shaped member having a handle integrally formed with respect thereto, a second dish shaped member attached to said first dish shaped member and concentric therewith, one of said dish shaped members overreaching the other and being formed with a lip turned outwardly from the body thereof and prongs issuing outwardly from one of said dish shaped members at the periphery of said inner dish shaped member.

3. A fish scaler comprising two dish shaped members having backs and of different diameters, said members being attached to one another with the convex side of one member contacting with the concave side of the other member, a handle secured to one of said members, a lip formed on the larger member at its periphery, and prongs formed on one of said members substantially at the periphery of the smaller member.

4. A fish scaler comprising two plate-like members arranged in overlying position and contacting with one another throughout a portion of the area thereof, said members being secured together, a lip extending outwardly from the marginal edge of one of said members, a handle secured to one of said members and prongs issuing outwardly from one of said members and disposed inwardly of said lip.

HARRY A. OLSON.